(12) United States Patent
Rankin et al.

(10) Patent No.: US 9,206,913 B2
(45) Date of Patent: Dec. 8, 2015

(54) CHECK VALVE HAVING PETALS WITH LIFT GENERATING ELEMENTS

(71) Applicant: Hamilton Sundstrand Corporation, Windsor Locks, CT (US)

(72) Inventors: Kevin M. Rankin, Windsor, CT (US); Josh Kamp, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 129 days.

(21) Appl. No.: 13/785,263

(22) Filed: Mar. 5, 2013

(65) Prior Publication Data

US 2014/0251461 A1    Sep. 11, 2014

(51) Int. Cl.
*F16K 15/03*    (2006.01)

(52) U.S. Cl.
CPC ............... *F16K 15/03* (2013.01); *F16K 15/036* (2013.01); *F16K 15/038* (2013.01); *Y10T 137/7839* (2013.01); *Y10T 137/7898* (2013.01)

(58) Field of Classification Search
CPC ..... F16K 15/03; F16K 15/036; F16K 15/038; Y10T 137/7839; Y10T 137/7898
USPC .................... 137/512.1, 527, 527.8
See application file for complete search history.

(56) References Cited

U.S. PATENT DOCUMENTS

| | | | | |
|---|---|---|---|---|
| 1,438,161 | A * | 12/1922 | Zimmerman | 137/512.1 |
| 3,452,778 | A | 7/1969 | Babcock | |
| 4,249,567 | A * | 2/1981 | Weiss | 137/512 |
| 4,373,544 | A | 2/1983 | Goodman et al. | |
| 5,246,032 | A * | 9/1993 | Muddiman | 137/512.1 |
| 5,855,224 | A | 1/1999 | Lin et al. | |
| 6,050,293 | A | 4/2000 | Lin et al. | |
| 6,227,299 | B1 | 5/2001 | Dennistoun | |
| 6,354,567 | B1 | 3/2002 | Vanderveen | |
| 6,530,395 | B2 | 3/2003 | Cunningham | |
| 6,648,013 | B1 | 11/2003 | Ray | |
| 8,015,825 | B2 | 9/2011 | Elder et al. | |
| 8,181,669 | B2 | 5/2012 | Dehais et al. | |
| 8,307,853 | B2 | 11/2012 | Bizzarro | |
| 2009/0071549 | A1 * | 3/2009 | Denike et al. | 137/512.1 |
| 2012/0042968 | A1 * | 2/2012 | Shanker | 137/527 |
| 2012/0181467 | A1 | 7/2012 | Dowd et al. | |
| 2012/0255631 | A1 | 10/2012 | Stradinger et al. | |

FOREIGN PATENT DOCUMENTS

WO    2007135744    11/2007

OTHER PUBLICATIONS

Extended Search Report issued in EP 14157006; Jun. 27, 2014; 5 pages.

* cited by examiner

*Primary Examiner* — Craig Schneider
*Assistant Examiner* — Frederick D Soski
(74) *Attorney, Agent, or Firm* — Cantor Colburn LLP

(57) ABSTRACT

A check valve is provided. The check valve includes a petal pivotably coupled to a hinge to occupy respective open and closed positions in accordance with a pressure differential of a fluid flow across the check valve and a lift generating element coupled to the petal and configured to aerodynamically interact with the fluid flow to generate a lift force on the petal.

20 Claims, 5 Drawing Sheets

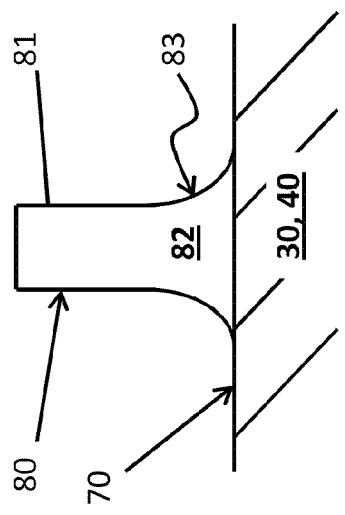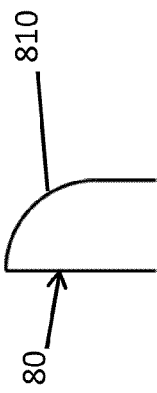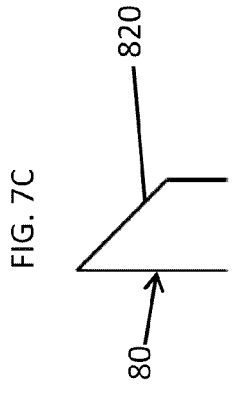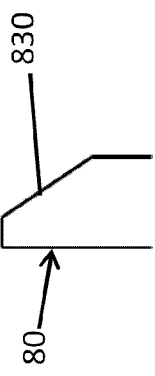

CHECK VALVE HAVING PETALS WITH LIFT GENERATING ELEMENTS

BACKGROUND OF THE INVENTION

The subject matter disclosed herein relates to a check valve and, more particularly, to a check valve having petals with lift generating elements, such as airfoils, to counterbalance petal weight.

In bleed systems where fluid pressure can be tapped off from either a high pressure stage compressor or a low pressure stage compressor, a check valve is needed to prevent the high pressure stage bleed air from backflowing into the low pressure stage compressor. This check valve often includes petals that occupy closed positions when the high pressure stage bleed air has a higher pressure than the low pressure stage compressor whereby the high pressure stage bleed air is prevented from backflowing into the low stage compressor. These petals open when the pressure of the low pressure stage compressor exceeds that of the high stage bleed air.

The check valves are often disposed in a vertical arrangement such that the petals sit on washer elements that bear the petal weight. As such, when the petals open and close, contact between the petals and the washer elements leads to wear and damage of the washer elements. This, in turn, leads to contact between the petals and the housing of the check valve.

BRIEF DESCRIPTION OF THE INVENTION

According to one aspect of the invention, a check valve is provided and includes a petal pivotably coupled to a hinge to occupy respective open and closed positions in accordance with a pressure differential of a fluid flow across the check valve and a lift generating element coupled to the petal and configured to aerodynamically interact with the fluid flow to generate a lift force on the petal in a direction transverse to a direction of the fluid flow.

According to another aspect of the invention, a check valve is provided and includes a check valve body having a seat defining an aperture through which fluid flow is permitted, a hinge disposed to bifurcate the aperture into first and second openings and a housing connected to the seat and supportively coupled to the hinge, first and second petals pivotably coupled to the hinge to occupy respective open and closed positions relative to the first and second openings, respectively, in accordance with a pressure differential of the fluid flow across the seat and lift generating elements coupled to each of the first and second petals, the lift generating elements being configured to aerodynamically interact with the fluid flow to generate a lift force on each of the first and second petals in a direction transverse to a direction of the fluid flow.

According to yet another aspect of the invention, a check valve is provided and includes a petal pivotably coupled to a hinge to occupy respective open and closed positions in accordance with a pressure differential of a fluid flow across the check valve and a lift generating element coupled to the petal and configured to aerodynamically interact with the fluid flow to generate a lift force on the petal in a direction transverse to a direction of the fluid flow.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 7A-7D are schematic axial views of an airfoil of the check valve of FIGS. 3 and 4 in accordance with embodiments.

The detailed description explains embodiments of the invention, together with advantages and features, by way of example with reference to the drawings.

DETAILED DESCRIPTION OF THE INVENTION

In accordance with aspects of the invention, a check valve is provided for use in bleed systems, for example. In such bleed systems, pressures can be tapped off from either a high pressure stage ("high stage") compressor or a low pressure stage ("low stage") compressor. The check valve serves to prevent high stage bleed air from backflowing into the low stage compressor and may be disposed in a substantially vertical formation. The check valve includes petals that occupy respective open and closed positions in accordance with pressure differentials across the check valve and the petals include lift generating elements, such as airfoils, to serve as a counterbalance for the weights of the petals.

Figure 1:
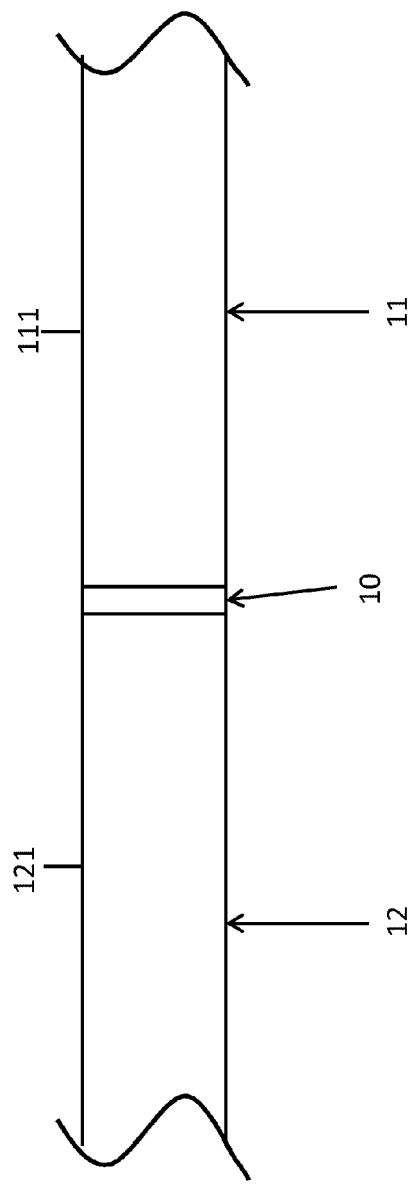
FIG. 1 is a schematic view of a check valve interposed between single ducts.
Figure 2:
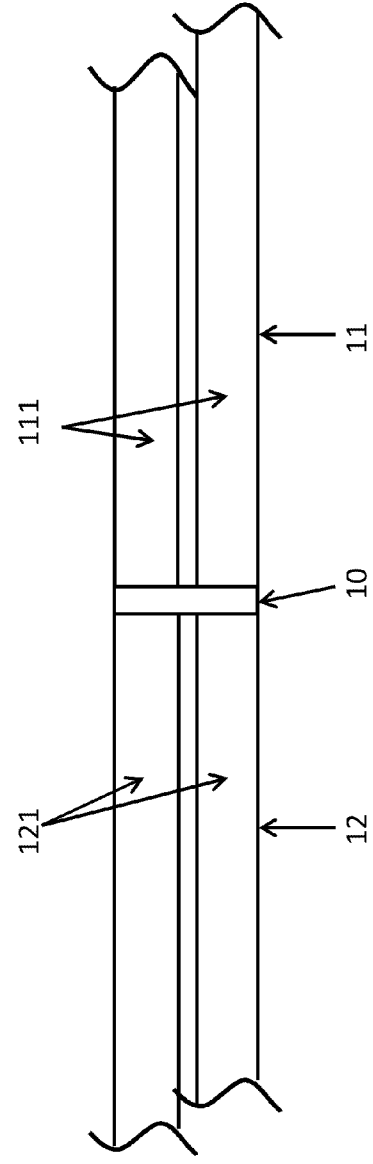
FIG. 2 is a schematic view of a check valve interposed between multiple ducts.

With reference to FIGS. 1 and 2, a check valve 10 is provided. The check valve 10 is interposed between upstream ductwork 11 and downstream ductwork 12. As shown in FIG. 1, the upstream ductwork 11 may be formed of a single duct 111 and the downstream ductwork 12 may be similarly formed of a single duct 121. This configuration is, of course, exemplary, and it is to be understood that alternate configurations are possible. For example, as shown in FIG. 2, the upstream ductwork 11 may be formed of multiple ducts 111 and the downstream ductwork 12 may be similarly formed of multiple ducts 121.

Figure 4:
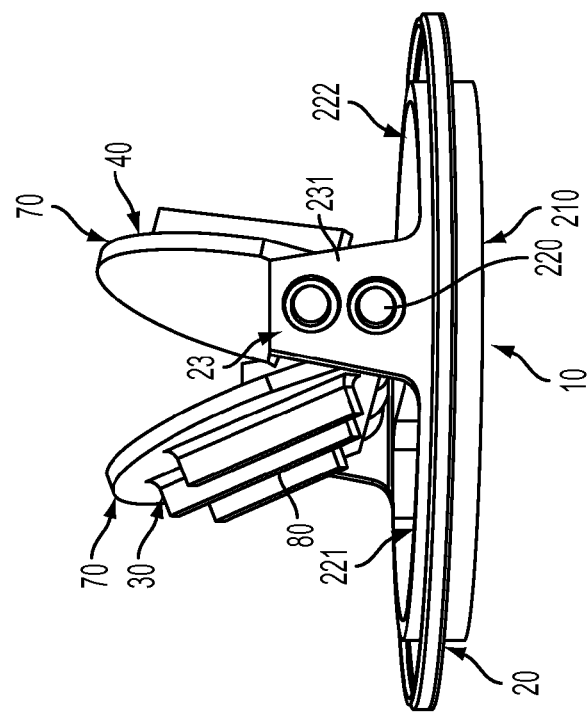
FIG. 4 is a perspective of the check valve of FIG. 3 in an open condition.
Figure 3:
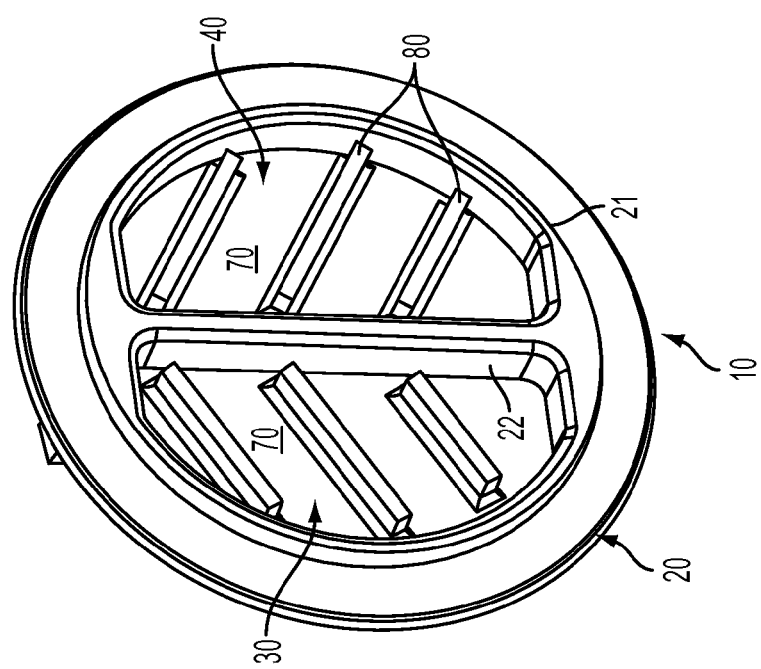
FIG. 3 is a perspective view of a closed check valve with airfoils in accordance with embodiments.
Figure 5:
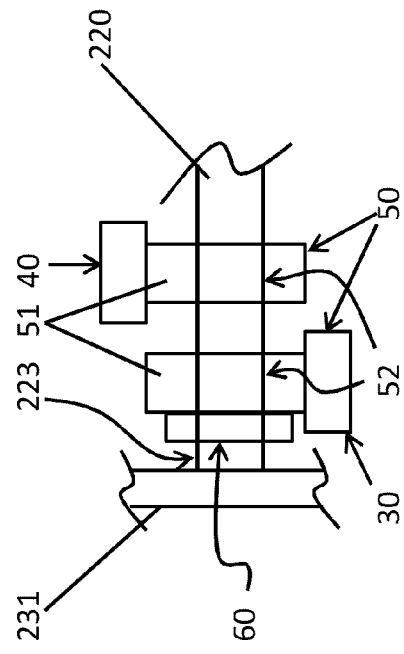
FIG. 5 is a schematic side view of a washer assembly of the check valve of FIGS. 3 and 4.

With reference to FIGS. 3-5, the check valve 10 includes a check valve body 20 and first and second petals 30 and 40. The check valve body 20 includes a seat 21, a hinge 22 and a housing 23. The seat 21 is annularly shaped and is formed to define an aperture 210 that extends axially from an upstream side of the seat 21, which is associated with the upstream ductwork 11, to a downstream side of the seat 21, which is associated with the downstream ductwork 12. In accordance with embodiments, the seat 21 may be configured to fit onto the upstream ductwork 11 and the downstream ductwork 12 such that the seat 21 is fluidly interposed between an aft end of the upstream ductwork 11 and a complementary forward end of the downstream ductwork 12.

The hinge 22 may be provided as a pin-hinge with a central pivot axis defined along a pin 220 and may be disposed to bifurcate the aperture 210 defined by the seat 21 to thereby further define a first opening 221 on one side of the hinge 22 and a second opening 222 on the other side of the hinge 22. Sidewalls 231 of the housing 23 are connected to the seat 21 and are respectively coupled to opposite ends 223 (see FIG. 5) of the pin 220 to support the hinge 22. The first and second petals 30 and 40 are pivotably coupled to the hinge 22 to pivot about the central pivot axis in response to a fluid pressure differential between fluid disposed within the upstream ductwork 11 (i.e., high stage bleed fluid) and fluid disposed in the downstream ductwork 12 (i.e., fluid in the low stage compressor). In particular, the first and second petals 30 and 40 are configured to pivot from respective closed positions at which the first and second petals 30 and 40 prevent fluid flow through the first opening 221 and the second opening 222 to respective open positions at which fluid flow through the first opening 221 and the second opening 222 is permitted.

In accordance with embodiments, a pressure differential between the upstream ductwork 11 and the downstream ductwork 12 may be about 20 psi or more. At such pressures, the first and second petals 30 and 40 may be disposed to pivot toward the respective open positions at an angular speed of about 150 radians per second or more.

As shown in FIG. 5, where the hinge 22 is provided as a pin-hinge with the central pivot axis defined along the pin 220, the opposite ends 223 of the pin 220 may be coupled to the sidewalls 231 of the housing 23 and bearing elements 50 may be disposed to pivotably couple the first and second petals 30 and 40 to the pin 220. The bearing elements 50 each include a body 51, which is connected to the corresponding one of the first and second petals 30 and 40. The body 51 is formed to define a borehole 52 through which the pin 220 extends. The interior diameter of the borehole 52 is sized to fit around the pin 220 such that the first and second petals 30 and 40 pivot relatively freely in accordance with the pressure differential between the upstream ductwork 11 and the downstream ductwork 12.

The bearing elements 50 may be sequentially arranged along a length of the pin 220. Thus, when the check valve 10 is disposed vertically between the upstream ductwork 11 and downstream ductwork 12, a lowest one of the bearing elements 50 is identifiable as being adjacent to the corresponding wing 231. This bearing element 50 is supported vertically by washer element 60, which is interposed between the bearing element 50 and the wing 231, such that as the first and second petals 30 and 40 open and close they are prevented from contacting or rubbing against the housing 23 generally or the wing 231 in particular.

In conventional check valves, the element corresponding to the above-noted washer element 60 tends to experience wear and damage due to the requirement that the washer element 60 bears the weight of the first and second petals 30 and 40. As such, the first and second petals 30 and 40 tend to become displaced and may contact or rub against the housing 23 generally or the sidewalls 231 in particular. Such contact or rubbing can lead to wear and damage of those components. In accordance with aspects of the present invention, however, improvements made to the check valve 10 as a whole serve to alleviate at least some of the need for the washer element 60 to bear the full weight of the first and second petals 30 and 40.

Figure 6:
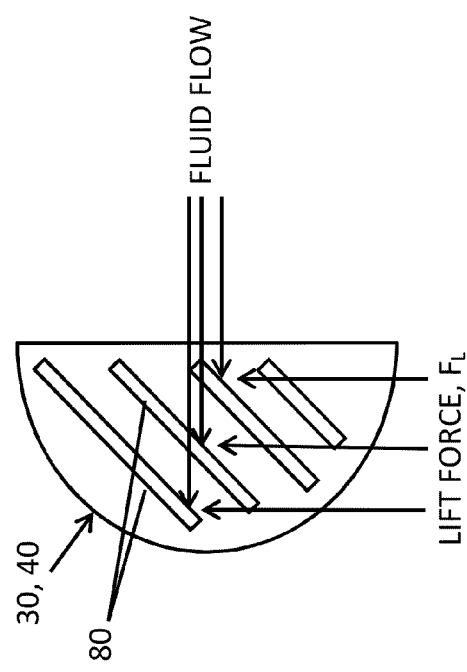
FIG. 6 is a schematic view of an operation of the check valve of FIGS. 3 and 4.

In accordance with embodiments and, as shown in FIGS. 3 and 4, the first and second petals 30 and 40 may each include a surface 70 that faces the upstream ductwork 11 when the first and second petals 30 and 40 are in the respective closed positions and lift generating elements, such as airfoils 80. The airfoils 80 are disposed on the respective surfaces 70 may be aligned with one another and arranged in a chevron pattern on either side of the hinge 22. As such, with reference to FIG. 6, when fluid flow proceeds from the upstream ductwork 11 to the downstream ductwork 12 and the first and second petals 30 and 40 pivot toward the respective open positions, the interaction between the fluid and the airfoils 80 generates a lift force $F_L$ on the corresponding one of the first and second petals 30 and 40. The lift force $F_L$ is orientation transversely relative to a predominant direction of the fluid flow. The magnitude of this lift force $F_L$ is related to the fluid pressure and the angling of the airfoils 80 and relieves at least some or all the requirement for the washer element 60 to bear the weight of the first and second petals 30 and 40.

The airfoils 80 may be angled at various angles relative to the vertical axis. In general, the degree of angling should be defined so as to generate sufficient lift force $F_L$ so that at least some or all the requirement for the washer element 60 to bear the weight of the first and second petals 30 and 40 can be relieved so that wear on the washer element 60 can be avoided. However, the degree of angling should be defined so as to avoid generating excessive lift whereby the flow is impeded or the lift force $F_L$ drives the top bearing element 50 into the washer element 60 on what would be the top of the check valve 10. Thus, the degree of the angling should take into account at least the weight of the first and second petals 30 and 40, the expected fluid pressures in the upstream and downstream ductwork 11 and 12, the number of airfoils 80 being employed and the costs associated with of installation, service and replacement.

With reference to FIG. 7A and, in accordance with embodiments, each airfoil 80 may include a generally rectangular volumetric body 81 and a fillet portion 82. The fillet portion 82 forms a rounded connection 83 between the airfoil 80 and the corresponding one of the respective surfaces 70. This rounded connection 83 serves to reduce stress concentrations at the connection of the corresponding airfoil 80 and the corresponding one of the respective surfaces 70 and as an aerodynamic feature that promotes the appropriate flow of fluid from the airfoil 80 to the corresponding one of the respective surfaces 70. In accordance with alternative embodiments, the fillet portion 82 may be a tapered or angular section as well.

Although the airfoil 80 is illustrated in FIG. 7A as having a generally rectangular body 81, it is to be understood that this is merely exemplary and that other embodiments are possible. For example, with reference to FIGS. 7A-7D, the airfoil 80 may include at a distal end thereof (i.e., the end remote from the corresponding one of the respective surfaces 70) one or more of a rounded edge portion 810 (see FIG. 7B), an angled edge portion 820 (see FIG. 7C) and a chamfered edge portion 830 (see FIG. 7D). The airfoils 80 of FIGS. 7B-7D may be relatively light as compared to the airfoil 80 of FIG. 7A.

It is to be understood that the lift generating elements can include the airfoils 80 or other similar features, such as a cam element that drives the first and second petals 30 and 40 upwardly when they pivot toward the respective open positions. The various features may be provided alone or in combination with one another.

Figure 8:
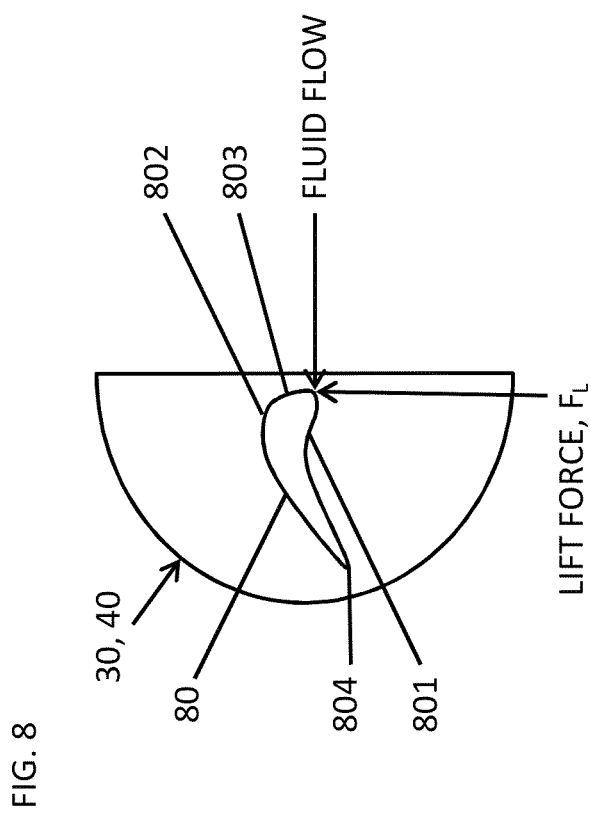
FIG. 8 is a schematic view of the check valve of FIGS. 3 and 4 in accordance with alternative embodiments.

In accordance with additional or alternative embodiments and, with reference to FIG. 8, the airfoils 80 may each be provided with airfoil shaped cross-sections. That is, as shown in FIG. 8, a single airfoil 80 may include a pressure surface 801, a suction surface 802 opposite the pressure surface 801, a leading edge 803 disposed at a front of the airfoil 80 relative to the fluid flow and a trailing edge 804 opposite the leading edge 803 (plural airfoil-shaped airfoils 80 are possible and have not been illustrated for clarity and brevity). In this embodiment, when fluid flow proceeds from the upstream ductwork 11 to the downstream ductwork 12 and the first and second petals 30 and 40 pivot toward the respective open positions, the interaction between the fluid and the airfoil-shaped airfoil 80 generates the lift force $F_L$ on the corresponding one of the first and second petals 30 and 40. The magnitude of this lift force $F_L$ is related to the factors mentioned above and additionally to the shape of the airfoil 80 and relieves at least some or all the requirement for the washer element 60 to bear the weight of the first and second petals 30 and 40. Where the airfoil 80 has an airfoil-shaped cross-section, the above-described fillet portion 82 may still be provided as a rounded connection 83 between the airfoil 80 and the corresponding one of the respective surfaces 70.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A check valve, comprising:
   a petal pivotably coupled to a hinge having a longitudinal axis, which is aligned with a vertical direction, the petal being pivotably coupled to the hinge via a bearing element to occupy respective open and closed positions in accordance with a pressure differential of a fluid flow across the check valve;
   a support disposed to vertically support the bearing element to bear the weight of the petal; and
   a lift generating element coupled to the petal and configured to aerodynamically interact with the fluid flow to generate a lift force on the petal in a direction transverse to a direction of the fluid flow to relieve the support of a petal weight bearing requirement.

2. The check valve according to claim 1, wherein the hinge comprises a pin-hinge.

3. The check valve according to claim 1, wherein the lift generating element is coupled to an upstream facing surface of the petal.

4. The check valve according to claim 1, wherein the lift generating element comprises an airfoil.

5. The check valve according to claim 4, wherein multiple airfoils are coupled to the petal.

6. The check valve according to claim 5, wherein the multiple airfoils are disposed in a chevron pattern.

7. The check valve according to claim 4, wherein the airfoil comprises one or more of a substantially rectangular, volumetric body, a rounded edge portion, an angled edge portion and a chamfered edge portion.

8. The check valve according to claim 4, wherein the airfoil comprises a fillet portion forming a rounded connection between the airfoil and the petal.

9. The check valve according to claim 4, wherein the airfoil has an airfoil-shaped cross-section.

10. A check valve, comprising:
    a check valve body having a seat defining an aperture through which fluid flow is permitted, a hinge disposed to bifurcate the aperture into first and second openings and a housing connected to the seat and supportively coupled to the hinge;
    first and second petals pivotably coupled to the hinge to occupy respective open and closed positions relative to the first and second openings, respectively, in accordance with a pressure differential of the fluid flow across the seat
    bearing elements disposed in sequence along the hinge to pivotably couple the first and second petals to the hinge;
    a washer element that vertically supports a lower one of the bearing elements to bear the weight of the first and second petals; and
    lift generating elements coupled to each of the first and second petals, the lift generating elements being configured to aerodynamically interact with the fluid flow to generate a lift force on each of the first and second petals in a direction transverse to a direction of the fluid flow to relieve the first and second petal weight bearing requirements of the washer element.

11. The check valve according to claim 10, wherein the hinge comprises a pin-hinge.

12. The check valve according to claim 10, wherein the lift generating elements are coupled to respective upstream facing surfaces of the first and second petals.

13. The check valve according to claim 10, wherein the lift generating elements comprise airfoils.

14. The check valve according to claim 13, wherein multiple airfoils are coupled to respective surfaces of each of the first and second petals.

15. The check valve according to claim 14, wherein the multiple airfoils are disposed in a chevron pattern.

16. The check valve according to claim 13, wherein the airfoils are angled with respect to the hinge.

17. The check valve according to claim 13, wherein each airfoil comprises one or more of a substantially rectangular, volumetric body, a rounded edge portion, an angled edge portion and a chamfered edge portion.

18. The check valve according to claim 13, wherein each airfoil comprises a fillet portion forming a rounded connection between the airfoil and the corresponding one of the first and second petals.

19. The check valve according to claim 13, wherein each airfoil has an airfoil-shaped cross-section.

20. A check valve, comprising:
    a petal pivotably coupled to a hinge to occupy respective open and closed positions in accordance with a pressure differential of a fluid flow across the check valve;
    bearing elements disposed in sequence along the hinge to pivotably couple the petal to the hinge;
    a washer element that vertically supports a lower one of the bearing elements to bear the weight of the petal; and
    a lift generating element coupled to the petal and configured to aerodynamically interact with the fluid flow to generate a lift force on the petal in a direction transverse to a direction of the fluid flow to relieve the washer element of a petal weight bearing requirement.

* * * * *